United States Patent
Tanaka

(10) Patent No.: US 6,317,147 B1
(45) Date of Patent: Nov. 13, 2001

(54) IMAGE FORMING METHOD USING REGISTRATION MARKS HAVING VARYING ANGLES

(75) Inventor: Toshiaki Tanaka, Fukaya (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/592,265

(22) Filed: Jun. 13, 2000

(51) Int. Cl.$^7$ .................................................. G03G 15/01
(52) U.S. Cl. ............................................ 347/116; 399/301
(58) Field of Search ................................ 347/19, 224, 14, 347/9, 5, 3, 116; 358/526; 399/39, 40, 299, 301, 306, 49

(56) References Cited

U.S. PATENT DOCUMENTS

| | | | |
|---|---|---|---|
| 4,916,547 | 4/1990 | Katsumata et al. | 358/300 |
| 5,072,244 | 12/1991 | Aoki et al. | 346/160 |
| 5,587,771 | * 12/1996 | Mori et al. | 347/116 |
| 5,854,958 | * 12/1998 | Tanimoto et al. | 347/116 |
| 5,995,717 | * 11/1999 | Tanaka | 347/116 |
| 6,008,826 | * 12/1999 | Foote et al. | 347/116 |

FOREIGN PATENT DOCUMENTS

| | | | | |
|---|---|---|---|---|
| 63-300263-A | * 12/1988 | (JP) | | G03G/15/01 |
| 7-19084 | 3/1995 | (JP) | | G03G/15/01 |
| 8-278680-A | * 10/1996 | (JP) | | G03G/15/01 |
| 2603254 | 1/1997 | (JP) | | G03G/15/01 |

* cited by examiner

*Primary Examiner*—John Barlow
*Assistant Examiner*—Robert D. Loper, Jr.
(74) *Attorney, Agent, or Firm*—Foley & Lardner

(57) ABSTRACT

An image forming method having a color alignment system in which a registration mark is printed in each color. Each registration mark has a first line segment extending in a first direction and a second line segment extending from a first end of the first line segment at a predetermined angle with the first direction. The predetermined angles vary among the marks printed. This prevents a complete overlap of two or more marks, thus allowing for sensing and distinguishing of each mark from the others.

18 Claims, 7 Drawing Sheets

IMAGE FORMING METHOD USING REGISTRATION MARKS HAVING VARYING ANGLES

BACKGROUND OF THE INVENTION

The present invention relates to an image forming method using a color printer or color copying machine, and particularly to an image forming method for forming images of colors by means of a plurality of image forming sections arranged in a direction of conveyance of a recording paper sheet.

For example, a color copying machine having an endlessly run conveyor belt and a plurality of image forming sections arranged at regular pitch along the conveyor belt is known as an image forming apparatus. In the color copying machine, a recording paper sheet is held on and conveyed by the conveyor belt, and images of colors are superposed on one another on the recording paper sheet by means of the image forming sections, thereby outputting a color image on the recording paper sheet.

It is considered to be very difficult, in this type of color copying machine, to make the travel speed of the conveyor belt, i.e., the speed of conveying the paper sheet, accurately coincide with the process speed in each of the image forming sections, and to shift the image forming timings in the respective image forming sections by a predetermined time in order to accurately superpose the images of the colors on one another on the recording paper sheet.

For this reason, in the conventional color copying machine, in a warm-up time in which a recording paper sheet is not conveyed (e.g., at the apparatus power-on time or in a reset operation after dealing with a jam), test patterns of the colors are formed on the conveyor belt by means of the respective image forming sections. The test patterns are detected to calculate an amount of deviation of the image forming positions in the respective image forming sections. Based on the calculated amount of positional deviation, the image forming timings or the like in the respective image forming sections are regulated, thereby correcting color drift of the image output to the recording paper sheet.

A wedge-shaped mark is known as a conventional test pattern. The mark has a first line segment extending in the main scanning direction, which is perpendicular to the travel direction of the conveyor belt, and a second line segment extending at an angle from one end of the first line segment. Wedge-shaped marks corresponding to the respective colors are directly formed on the conveyor belt at predetermined positions arranged at regular intervals along the direction of travel of the conveyor belt, i.e., the sub-scanning direction. The wedge-shaped marks corresponding to the respective colors formed on the conveyor belt are detected in sequence by a sensor fixed so as to face the conveyor belt on a side downstream from the image forming sections. Based on the detection result, positional deviation of the image forming positions in the image forming sections is detected with respect to the main scanning and sub-scanning directions. The image forming positions of the respective image forming sections are corrected to correct the positional deviation, so that the color drift of the image can be corrected.

However, according to the conventional color drift correcting sequence using the wedge-shaped mark as described above, it is necessary to sequentially form a plurality of wedge-shaped marks on the conveyor belt in the apparatus warm-up time. In particular, to increase the accuracy of detecting color drift, it is necessary to form a number of wedge-shaped marks preferably over the length of the circumference of the conveyor belt. In this case, a great deal of time is required for the color drift correcting sequence. If a long period of time is required for the color drift correcting sequence, it takes a considerable time to carry out first copy after the power is turned on. Thus, the productivity of the apparatus is lowered.

Further, if the color drift correcting sequence is carried out only at the apparatus warm-up time as described above, it is impossible to correct color drift due to a change with time of a structural element of the apparatus, such as thermal expansion. For example, it is known that one of the rollers around which the conveyor belt is wound is influenced by a fixing apparatus located near the roller, with the result that the diameter of a roller is thermally expanded with the elapse of time. In this case, the travel speed of the conveyor belt is increased, resulting in color drift. Such color drift cannot be corrected by the color drift correcting sequence only at the warm-up time described above.

To correct the color drift resulting from such a change with time, for example, a method is considered in which the interval between recording paper sheets supplied in an image forming operation is extended, the aforementioned wedge-shaped marks are formed between the paper sheets, and color drift in every interval between paper sheets is detected to correct the color drift.

In this method, however, wedge-shaped marks of the number at least the same as the number of the image forming sections must be formed every interval between paper sheets along the sub-scanning direction. Therefore, the interval between the supplied paper sheets must be considerably long. Accordingly, the number of supplied paper sheets on which an image can be formed per unit time is reduced, with the result that the productivity of the apparatus as a whole is inevitably lowered.

Therefore, instead of forming wedge-shaped marks between paper sheets, a method is considered in which wedge-shaped marks are formed along a side end of the conveyor belt outside the region for holding paper sheets. In this method, since the interval between supplied recording paper sheets can be reduced, the number of paper sheets which can be supplied per unit time can be increased. On the other hand, it is necessary that the width of the conveyor belt be wider than that of a recording paper sheet of the maximum size. As a result, the size of the apparatus is inevitably increased.

BRIEF SUMMARY OF THE INVENTION

The present invention was made in consideration of the above matters, and its object is to provide an image forming method which can increase the productivity concerning the image forming operation and form a quality image without color drift.

To achieve the above object, according to the present invention, there is provided an image forming method for forming a predetermined image by conveying media, on which an image is to be formed, to a plurality of image forming sections by conveying means, and superposing images formed by the plurality of image forming sections on the conveyed media, the method comprising:

a mark forming step for forming a plurality of marks on the conveying means in the image forming sections;

a detecting step for detecting the plurality of marks; and a correcting step for correcting overlap of images formed by the plurality of image forming sections based on a result of detection obtained by the detecting step, the plurality of marks having first line segments extending in a first direction and second line segments extending from first ends of the first line segments at predetermined angles with the first direction, the predetermined angles varying among the plurality of marks.

Further, according to the present invention, there is provided an image forming method for forming a predetermined image by conveying media, on which an image is to be formed, to a plurality of image forming sections by conveying means, and superposing images formed by the plurality of image forming sections on the conveyed media, the method comprising:

a mark forming step for forming a plurality of marks on the conveying means by the image forming sections;

a detecting step for detecting the plurality of marks;

a modifying step for modifying the plurality of marks formed in the mark forming step, on condition that all marks are not detected in the detecting step, a correcting step for correcting overlap of images formed by the plurality of image forming sections based on a result of detection obtained by the detecting step, the plurality of marks having first line segments extending in a first direction and second line segments extending from first ends of the first line segments at predetermined angles with respect to the first direction, the predetermined angles varying among the plurality of marks.

Furthermore, according to the present invention, there is provided an image forming method for forming a predetermined image by conveying media, on which an image is to be formed, to a plurality of image forming sections by conveying means, and superposing images formed by the plurality of image forming sections on the conveyed media, the method comprising:

a mark forming step for forming a plurality of marks on the conveying means by the image forming sections;

a detecting step for detecting the plurality of marks;

a deviation amount calculating step for calculating amounts of deviation of the plurality of marks based on a result of detection obtained by the detecting step;

a comparing step for comparing the amounts of deviation calculated in the deviation amount calculating step with a threshold value prepared in advance; and a correcting step for correcting overlap of images formed by the plurality of image forming sections based on the amounts of deviation calculated in the deviation amount calculating step, on condition that the amounts of deviation exceed the threshold value as a result of the comparing step, the plurality of marks having first line segments extending in a first direction and second line segments extending from first ends of the first line segments at predetermined angles with respect to the first direction, the predetermined angles varying among the plurality of marks.

DETAILED DESCRIPTION OF THE INVENTION

An embodiment of the present invention will be described in detail with reference to the drawings.

Figure 1:
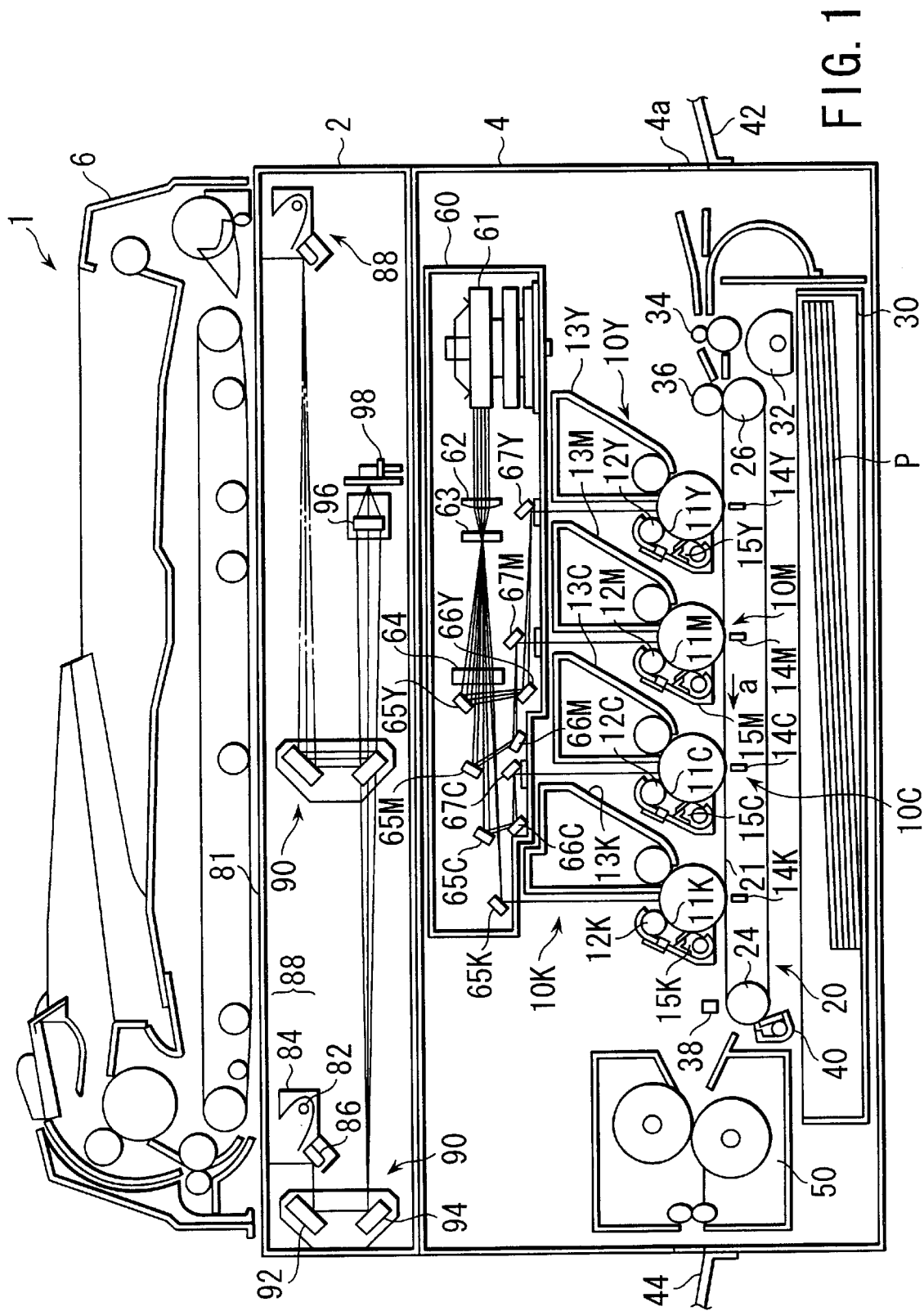
FIG. 1 is a schematic diagram showing a color copying machine according to an embodiment of the present invention.
Figure 2:
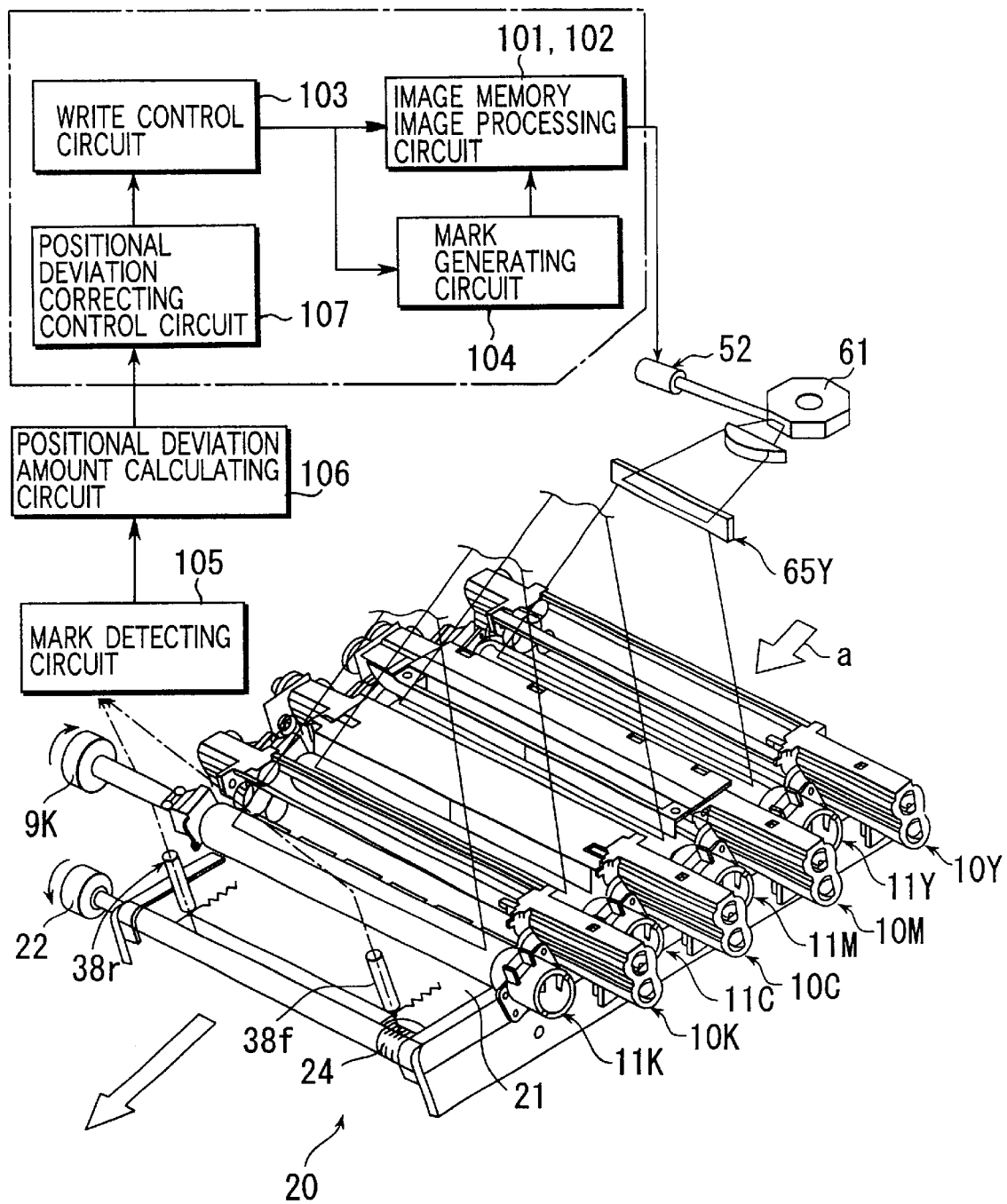
FIG. 2 is a diagram showing a structure of a main portion of the color copying machine shown in FIG. 1 and a circuit configuration for correcting color drift of an image.

FIG. 1 shows a schematic structure of a 4-gang tandem color digital copying machine 1 as an image forming apparatus of the present invention (hereinafter simply referred to as a color copying machine 1). FIG. 2 shows a structure of a main portion of the color copying machine 1 shown in FIG. 1 along with a circuit configuration for correcting color drift of a color image.

As shown in FIG. 1, the color copying machine 1 comprises: a scanner section 2 for reading image data from an object of reading, i.e., an original; a printer section 4 for forming on a recording paper sheet an image based on image data read from the original by the scanner section 2 or image data input from an external apparatus (not shown), such as a computer; and an automatic document feeder (ADF) 6 for feeding one by one a plurality of originals (or one original) to an original table 81 (to be described later) of the scanner section 2. The ADF 6, attached to the original table 81 and allowed to be open and close, also serves as an original presser for pressing an original placed on the original table 81.

The printer section 4 has first to fourth image forming sections 10Y, 10M, 10C and 10K for respectively forming images of four colors, i.e., a yellow (Y) image, a magenta (M) image, a cyan (C) image and a black (B) image.

Image data read by the scanner section 2 or image data input from an external device is input to an image processing circuit 102 (FIG. 2), and decomposed into the respective color components. A plurality of image data decomposed into the color components are supplied to the corresponding image forming sections 10Y, 10M, 10C and 10K. The image forming sections 10Y, 10M, 10C and 10K form images of the respective colors based on the image data of the respective color components generated by the image processing circuit 102.

A conveyor mechanism 20 for conveying a recording paper sheet through the image forming sections is arranged under the image forming sections 10Y, 10M, 10C and 10K. The conveyor mechanism 20 has a conveyor belt 21 which endlessly runs at a constant speed in the direction of the arrow "a" indicated in the drawing. The conveyor belt 21 is wound around and extended between a driver roller 24, rotated by a belt motor 22 as shown in FIG. 2, and a driven roller 26 spaced apart from the driver roller 24 at a predetermined distance.

The image forming sections 10Y, 10M, 10C and 10K respectively include photosensitive drums 11Y, 11M, 11C and 11K which rotatably contact with the conveyor belt 21 and are rotated in the same direction as the travel of the conveyor belt 21. The rotation shafts of the photosensitive drums 11Y, 11M, 11C and 11K are respectively connected directly to drum motors 9Y, 9M, 9C and 9K for rotating the photosensitive drums at a predetermined circumferential speed (in FIG. 2, only the motor 9K is shown for the purpose of simplicity of the drawing). The rotation shafts of the photo-sensitive drums 11Y, 11M, 11C and 11K extends in the direction (main scanning direction) perpendicular to the direction of travel of the conveyor belt 21 (sub-scanning direction). The rotation shafts are arranged so as to be spaced at regular intervals along the sub-scanning direction.

To prevent color drift of a color image input to a recording paper sheet, it is necessary to control the travel speed of the conveyor belt 21 and the circumferential speed of the photosensitive drums 11Y, 11M, 11C and 11K to be the same. For this purpose, the rotation speed of the belt motor 22 is monitored and feedback-controlled, and the rotation speed of the drum motors 9Y, 9M, 9C and 9K is also monitored and feedback-controlled. With this control, in an ideal case, the speeds of the conveyor belt 21 and the photosensitive drums 11Y, 11M, 11C and 11K are controlled to be the same.

Charging rollers 12Y, 12M, 12C and 12K extending in the main scanning direction, developing apparatuses 13Y, 13M, 13C and 13K, transferring apparatuses 14Y, 14M, 14C and 14K and cleaning apparatuses 15Y, 15M, 15C and 15K are arranged in this order around the respective photosensitive drums 11Y, 11M, 11C and 11K in the direction of the rotation of the corresponding drums. The transferring apparatuses 14Y, 14M, 14C and 14K are located at positions to sandwich the conveyor belt 21 together with the corresponding photosensitive drums, i.e., inside the loop of the conveyor belt 21. Exposure points means of by an exposing apparatus 60 (to be described later) are formed on the circumferential surfaces of the photosensitive drums between the respective charging rollers 12Y, 12M, 12C and 12K and the respective developing apparatuses 13Y, 13M, 13C and 13K.

A paper cassette 30 in which a plurality of paper sheets P are stacked is arranged under the conveyor mechanism 20. A pickup roller 32 for picking up one by one the paper sheets P stored in the paper cassette 30 from the uppermost one is arranged at a right end portion of the paper cassette 30 in the drawing, i.e., an end portion near the driven roller 26 of the conveyor mechanism 20.

A pair of resist rollers 34 is arranged between the pickup roller 32 and the driven roller 26. The pair of resist rollers 34 first aligns the top end of the paper sheet P picked up from the paper cassette 30 by pressing it to abut against the nip thereof, then rotates in accordance with an image formation timing of the first image forming section 10Y on the most upstream side, and sends the aligned paper sheet toward the image forming section 10Y. As a result, the top end of the paper sheet P picked up from the paper cassette 30 is aligned with the top end of a Y toner image formed on the photosensitive drum 11Y.

An attracting roller 36 is located between the pair of resist rollers 34 and the first image forming section 10Y and near the driven roller 26, substantially on the periphery of the driven roller 26 with the conveyor belt 21 interposed therebetween. The attracting roller 36 provides a predetermined charge to the paper sheet P supplied via the pair of resist rollers 34, so that the paper sheet P is electrostatically attracted to the conveyor belt 21.

Figure 3:
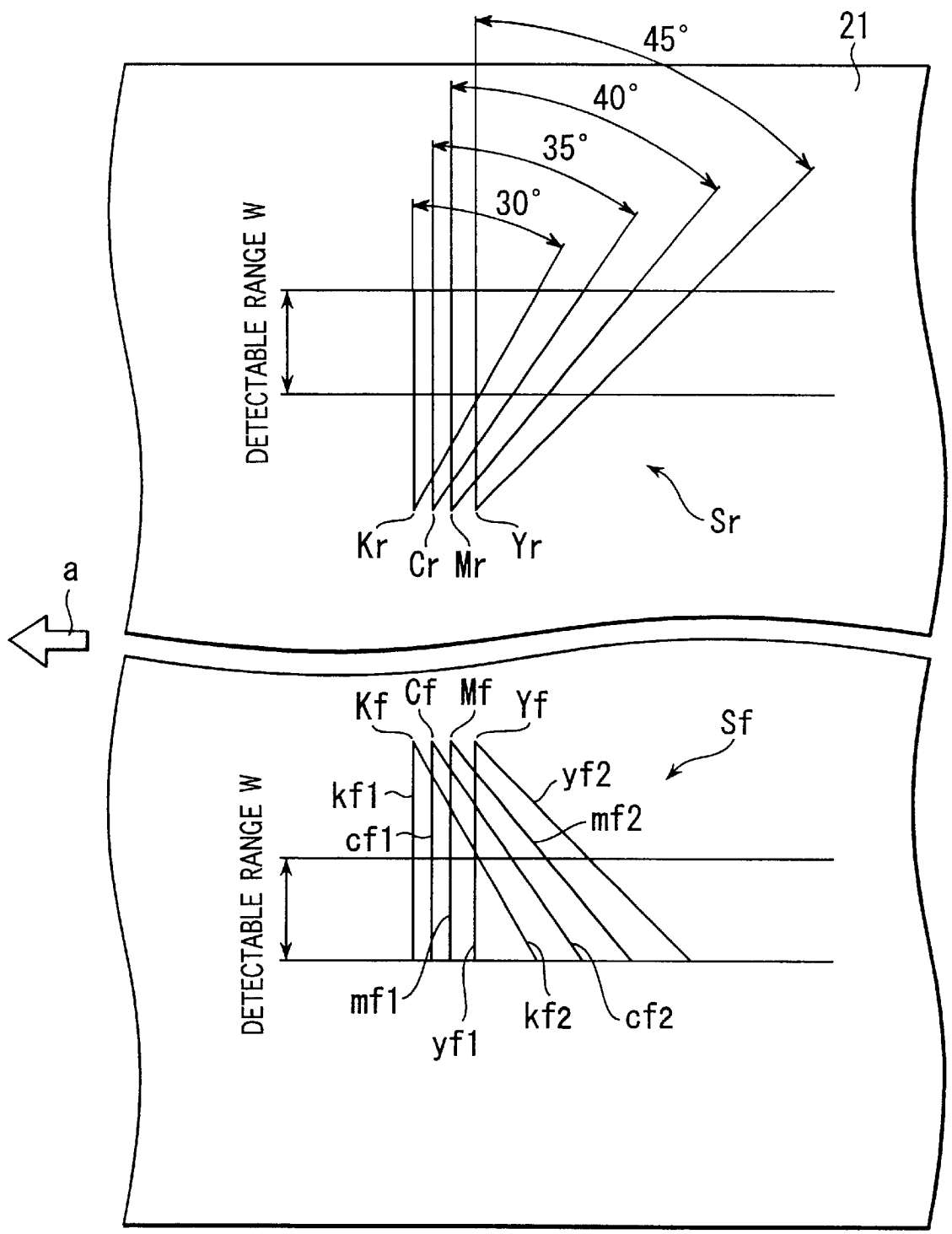
FIG. 3 is a diagram showing a pair of overlapping marks for use in a color drift correcting sequence.

On the other side, a pair of sensors 38f and 38r is located above the driver roller 24. The sensors 38f and 38r respectively detects overlapping marks Sf and Sr (resist marks) as shown in FIG. 3, constituted by a plurality of partially overlapped line segments formed on the conveyor belt 21 to correct positional deviation of an image. The pair of sensors 38f and 38r are optical sensors of transmission type or reflection type. The sensors are located at positions opposing to the overlapping marks formed on the conveyor belt 21, i.e., near both end portions in the width direction of the conveyor belt 21, a predetermined distance spaced apart from each other along the main scanning direction. The aforementioned four photosensitive drums 11Y, 11M, 11C and 11K and the sensors 38f and 38r are arranged at regular intervals in the direction of the travel of the conveyor belt 21 (in the direction of the arrow "a").

A belt cleaner (erasing means) 40 for removing toners or paper leavings of the paper sheet P adhered to the conveyor belt 21 is located on the circumference of the driver roller 24 on the downstream side of the sensor 38 at a position facing the conveyor belt 21.

A fixing apparatus 50 having a pair of heat rollers for conveying the paper sheet P, on which a toner image is transferred and which is inserted therebetween, is located at a position on the left side in the drawing of the driver roller 24 of the conveyor mechanism. The fixing apparatus 50 heats the paper sheet P to a predetermined temperature and presses it with a predetermined pressure, thereby melting and pressurizing the toner image transferred on the paper sheet P, so that the melted toner image is fixed on the recording paper sheet.

A feeding port 4a for manually feeding a recording paper sheet P is formed on the right side in the drawing of the housing of the printer section 4. A paper feed tray 42 is attached to the feeding port 4a. The recording paper sheet, which is manually fed through the feeding port 4a, is first aligned by the resist rollers 34, then transmitted to the conveyor mechanism 20, and passed through a transfer region between the conveyor mechanism and the image forming sections 10Y, 10M, 10C and 10K.

A paper discharge tray 44 for receiving the paper sheet P discharged outside the apparatus through the fixing apparatus 50 is attached to the left side in the drawing of the printer section 4.

The exposing apparatus 60 for forming latent images based on the image data of the respective colors on the photosensitive drums 11Y, 11M, 11C and 11K is located above the image forming sections 10Y, 10M, 10C and 10K. The exposing apparatus 60 has laser beam emission apparatuses 52 for the respective colors (only a laser emission apparatus for black is shown in FIG. 2 as a representative), which are respectively emission-controlled on the basis of the image data of the color components color-decomposed by the image processing circuit 102. A polygon mirror 61 for reflecting and scanning each laser beam is located on an optical path of the laser beam emission apparatus 52 of each color. First to third fθ lenses 62, 63 and 64, for correcting the focus of the laser beam reflected by the polygon mirror 61 and forming an image on the circumference of the corresponding drum, are arranged in this order in the optical path of the laser beam of each color guided through the polygon mirror 61.

First reflection mirrors 65Y, 65M, 65C and 65K, for reflecting the laser beams of the respective colors passed through the third fθ lens 64 toward the exposure points of the respective photosensitive drums, are located between the third fθ lens 64 and the respective photosensitive drums 11Y, 11M, 11C and 11K. Second reflection mirrors 66Y, 66M and 66C and third reflection mirrors 67Y, 67M and 67C, for further reflecting the laser beams reflected by the first reflection mirrors 65Y, 65M and 65C, are also located therebetween. The laser beam for black, after reflected by the first reflection mirror 65K, is guided to the photosensitive drum 11K without passing through the other mirrors.

The scanner section 2 has the original table 81 made of transparent glass, on which an original is to be set. A first carriage 88 is provided under the original table 81. An exposure lamp 82 for irradiating an original placed on the original table 81, a reflector 84 for converging the light from the exposure lamp 82 onto the original, a first mirror 86 for reflecting the reflected light from the original toward the left in the drawing, etc. are mounted on the first carriage 88. The first carriage 88 is moved in parallel with the original table 81 by means of a driving mechanism (not shown).

A second carriage 90 is provided on the left side of the first carriage in the drawing, i.e., in the direction in which the light reflected by the first mirror 86 is guided. The second carriage is movable in parallel with the original table 81 by means of a driving mechanism (not shown). The second carriage 90 includes a second mirror 92 for reflecting downward the reflected light from an original guided by the first mirror 86 and a third mirror 94 for reflecting the reflected light from the second mirror 92 to the right in the drawing. The second and third mirrors 92 and 94 are arranged perpendicular to each other. The second carriage 90 is driven following the first carriage 88, and moved in parallel with the first carriage 88 at a speed half that of the first carriage 88.

A imaging lens 96 for imaging the reflected light from the second carriage 90 at a predetermined magnification is located in a plane including the optical axis of the light reflected via the second carriage 90. A CCD image sensor 98 for converting the reflected light, converged by the imaging lens 96, to an electric signal, i.e., image data, is located in a plane substantially perpendicular to the optical axis of light passed through the imaging lens 96.

When light from the exposure lamp 82 is converged on the image placed on the original table 81 via the reflector 84, the reflected light from the original is incident on the CCD image sensor 98 via the first mirror 86, the second mirror 92, the third mirror 94 and the imaging lens 96. The light is converted to image data in the CCD image sensor 98. The image data obtained through the CCD image sensor 98 is input to the image processing circuit 102 and color-decomposed.

As shown in FIG. 2, a circuit for correcting color drift of an image includes: a mark generating circuit 104 for outputting image data relating to the overlapping marks shown in FIG. 3; a mark detecting circuit 105 for detecting an overlapping mark on the conveyor belt 21 via the sensors 38f and 38r; a positional deviation amount calculating circuit 106 for calculating the amount of positional deviation of an image based on a detection signal detected by the mark detecting circuit 105; a positional deviation correcting control circuit 107 for setting an amount of correction for correcting the positional deviation based on the positional deviation amount calculated by the positional deviation amount correcting circuit 106; and a write control circuit 103 for controlling emission timing, etc. of the laser beam emission apparatus 52 based on the amount of correction set by the positional deviation correcting control circuit 107. The amount of correction set by the positional deviation correcting control circuit 107 is fed back to rotation speed control of the photosensitive drums 11Y, 11M, 11C and 11K and travel speed control of the conveyor belt 21, so that the deviation of each of the mechanisms of the color copying machine 1 can be corrected.

An image forming operation of the color copying machine having the above structure will be described in detail.

When a power switch (not shown) is turned on, an initializing operation of the color copying machine 1 is carried out: that is, the pair of heat rollers of the fixing apparatus 50 is heated to a predetermined temperature, and at the same time the rotation speeds of the respective motors are stabilized. Thus, the color copying machine 1 is maintained at a standby condition. The surface of the original placed on the original table 81 is scanned by the scanner section 2, and image data based on the image of the original is obtained through the CCD image sensor 98. The image data obtained through the CCD image sensor 98 is provisionally stored in an image memory 101. Then, it is color-decomposed into image data of the respective color components by the image processing circuit 102, and if necessary, subjected to image processes, such as scaling, rotation and movement, for the respective colors.

A step of forming a Y image based on Y (yellow) image data by means of the first image forming section 10Y will now be described as a representative. Needless to say, an M (magenta) image, a C (cyan) image and a K (black) image are formed in the same manner by the second to fourth image forming sections 10M, 10C and 10K.

First, the surface of the photosensitive drum 11Y is uniformly charged by means of the charging roller 12Y. Then, the laser beam emission apparatus 52 is emission-controlled based on the Y image data generated by the image processing circuit section 102. The laser beam based on the Y image data is radiated to a predetermined exposure point of the photosensitive drum 11Y through the exposing apparatus 60. As a result, a Y electrostatic latent image corresponding to the color-decomposed Y image data is formed on the circumferential surface of the photosensitive drum 11Y.

The Y electrostatic latent image formed on the circumferential surface of the photosensitive drum 11Y is moved by rotating the photosensitive drum 11Y, and passed through the developing apparatus 13Y. Y toner is supplied to the Y electrostatic latent image through the developing apparatus 13Y, so that the Y electrostatic latent image is converted to a visible image. Thus, the Y toner image formed on the circumferential surface of the photosensitive drum 11Y is passed through a Y transfer region, where the photosensitive drum 11Y rotatably contacts to the conveyor belt 21, by the rotation of the photosensitive drum 11Y.

The recording paper sheet P stored in the paper cassette 30 is picked up by the pickup roller 32, and aligned by the resist rollers 34. Thereafter, it is sent toward the Y transfer region at a predetermined timing. Alternatively, the recording paper sheet P manually fed through the feeding port 4a is first aligned by the resist rollers 34. Thereafter, it is sent toward the Y transfer region at the predetermined timing. The recording paper sheet P sent through the resist rollers 34 is attracted to the conveyor belt 21 by the attracting roller 36. It is then passed through the Y transfer region between the conveyor belt 21 and the photosensitive drum 11Y by the travel of the conveyor belt 21. In this time, by the function of the transferring apparatus 14Y, the Y toner image formed on the circumferential surface of the photosensitive drum 11Y is transferred on the recording paper sheet P passed through the Y transfer region.

Subsequently, an M toner image, a C toner image and K toner image formed on the photosensitive drums 11M, 11C and 11K are successively superposed and transferred by the second, third and fourth image forming sections 10M, 10C and 10K on the Y toner image formed on the recording paper sheet P conveyed by the conveyor belt 21. In other words, in the case of printing a plurality of colors, a cycle of the image forming operation, constituted by charging, exposure, development and transfer, is executed. As a result, toner images of a plurality of colors are superposed and transferred on the recording paper sheet P.

In this case, since the photosensitive drums 11Y, 11M, 11C and 11K are spaced at regular intervals along the direction of conveyance of the recording paper sheet P, the image forming timings in the image forming sections 10Y, 10M, 10C and 10K are shifted in order to accurately superpose the images of the respective colors on one another on the recording paper sheet P attracted to and conveyed by the conveyor belt 21. In other words, the toner images of the respective colors are accurately superposed on one another on the recording paper sheet, shifting the image forming timings in the image forming sections 10Y, 10M, 10C and 10K by a predetermined time (the distance between the photosensitive drums/the travel speed of the conveyor belt).

Residual toners, which have not been transferred to the recording paper sheet P but remain on the circumferential surfaces of the photosensitive drums 11Y, 11M, 11C and 11K, are cleaned by the respective cleaning apparatuses 15Y, 15M, 15C and 15K.

The recording paper sheet P, which is passed through the transfer regions of the respective image forming sections 10Y, 10M, 10C and 10K and on which the toner images of the respective colors are superposed and transferred, is removed from the conveyor belt 21, send to the fixing apparatus 50, and passed through the pair of heat rollers. When the recording paper sheet P is passed through the pair of heat rollers, the toner images on the recording paper sheet P are heated and pressed to the recording paper sheet P. As a result, the toner images of the four colors are melted and adhered by pressure to the recording paper sheet P. The recording paper sheet, on which the four color toner images are thus fixed and a color image is formed, is discharged to the paper discharge tray 44 provided outside the apparatus.

The toners adhered to the conveyor belt 21 (including the overlapping marks) and paper leavings generated from the recording paper sheet P are removed by the belt cleaner.

In the 4-gang tandem color copying machine 1 as described above, in order to form a quality image, it is important to accurately superpose the images of the respective color components formed in the image forming sections 10Y, 10M, 10C and 10K on the recording paper sheet P conveyed by the conveyor belt 21. However, it is very difficult to form a color image free of color drift on the recording paper sheet P, because of a shift of exposure points with respect to the circumferential surfaces of the photosensitive drums 11Y, 11M, 11C and 11K, a shift of the pitch of the four photosensitive drums along the sub-scanning direction, a slip between the conveyor belt 21 and the driver roller 24, a change in speed of the conveyor belt 21 due to thermal expansion of the driver roller 24 located near the fixing apparatus 50, and so on. For this reason, in general, the color copying machine forms the resist marks of the respective colors directly on the conveyor belt via the image forming sections 10Y, 10M, 10C and 10K, utilizing a warm-up time at the apparatus power-on time or after dealing with a jam and during an interval between timings at which the recording paper sheets P are supplied in an image forming operation. The resist marks are detected by the sensors 38f and 38r, so that color drift can be corrected.

FIG. 3 shows the resist marks used in the color drift correcting sequence of the present invention, i.e., the pair of overlapping marks, Sf and Sr. The overlapping marks Sf and Sr are directly formed on the conveyor belt 21 near both end portions in the width direction of the conveyor belt 21 (the main scanning direction), i.e., on the front side (f) and the rear side (r) of the color copying machine 1, separated from each other at a predetermined distance. The overlapping marks Sf and Sr are formed symmetrical with respect to the center line (not shown) extending in the sub-scanning direction of the conveyor belt 21. The term "symmetrical" used in the present application (including the claims) is not limited to the perfect symmetry with respect to the center line, but it means that the marks are located on both sides of the center line. FIG. 3 shows overlapping marks Sf and Sr completely free from positional deviation formed by the image forming sections in the ideal state in which there is no deviation in the image forming positions in the image forming sections 10Y, 10M, 10C and 10K. In this embodiment, the pair of overlapping marks Sf and Sr are used; however, a plurality of pairs of overlapping marks, separated from each other at a predetermined distance, may be formed along the sub-scanning direction of the conveyor belt 21.

Since the pair of overlapping marks Sf and Sr are formed symmetrical with respect to the center line of the conveyor belt 21, the overlapping mark Sf formed on the front side of the apparatus is described as a representative and a description of the overlapping mark Sr on the rear side is omitted.

The overlapping mark Sf is made of overlapping wedge-shaped marks (hereinafter referred simply as wedge marks) Yf, Mf, Cf and Kf for the four colors. The wedge marks Yf, Mf, Cf and Kf respectively comprise first line segments yf1, mf1, cf1 and kf1 extending straight in the width direction of the conveyor belt 21, i.e., the main scanning direction and second line segments yf2, mf2, cf2 and kf2 extending straight from ends of the first line segments in slanting directions. The wedge marks Yf, Mf, Cf and Kf are overlapped such that the first line segments yf1, mf1, cf1 and kf1 parallel to one other are arranged closely in the sub-scanning direction. The entire length of the overlapping mark Sf along the sub-scanning direction is shortened. Although the wedge marks Yf, Mf, Cf and Kf overlap in portions near their vertexes, neither the first line segments yf1, mf1, cf1 and kf1 nor the second line segments yf2, mf2, cf2 and kf2 overlap one other.

The inclinations of the second line segments yf2, mf2, cf2 and kf2 with respect to the first line segments yf1, mf1, cf1 and kf1 of the wedge marks Yf, Mf, Cf and Kf are set smaller than 90°. The marks have different inclinations corresponding to the respective colors. In this embodiment, the inclination of the second line segment kf2 with respect to the first line segment kf1 of the wedge mark Kf, formed on the most downstream side, is set to 30°. The inclination of the wedge mark Cf, upstream of the wedge mark Kf, is set to 35°, the inclination of the next wedge mark Mf is set to 40°, and the inclination of the wedge mark Yf formed on the most upstream side is set to 45°. The inclinations of the respective wedge marks Yf, Mf, Cf and Kf may be of any angles, so far as they are acute angles, i.e., smaller than 90°, but preferably around 45°. However, it is necessary that the inclinations of the wedge marks Yf, Mf, Cf and Kf be set at least such that the inclination of a wedge mark on an upstream side be greater than that of a wedge mark on a downstream side along the direction of conveyance "a".

Since the inclinations of the wedge marks Yf, Mf, Cf and Kf are gradually vary as described above, even if the positions of the wedge marks are deviated and the adjacent wedge marks are close to each other, the slanting second line segments yf2, mf2, cf2 and kf2 can be prevented from being completely superposed, although they may cross one another. As a result, the second line segments are prevented from overlapping but always be detectable individually, whereby the accuracy of detection of the overlapping marks Sf and Sr can be improved. In addition, since the second line segments yf2, mf2, cf2 and kf2 do not overlap one another, the wedge marks Yf, Mf, Cf and Kf can be formed at a high density, very close to each other in the sub-scanning direction. Therefore, the entire length of the overlapping mark Sf in the sub-scanning direction can be short.

The first line segments yf1, mf1, cf1 and kf1 of the wedge marks Yf, Mf, Cf and Kf have the same length along the main scanning direction. They are arranged parallel to each other at regular intervals along the sub-scanning direction. The ends of the first line segments are aligned along the sub-scanning direction. The second line segments yf2, mf2, cf2 and kf2 of the wedge marks Yf, Mf, Cf and Kf extend from the ends on the rear side of the first line segments yf1, mf1, cf1 and kf1, i.e., the ends nearer to the center of the belt, at the predetermined angles toward the upstream side in the direction of conveyance. The ends of the second line segments nearer to the side of the belt are aligned with the ends on the front side of the first line segments along the sub-scanning direction.

A plurality of pairs of overlapping marks Sf and Sr, as described above, are formed at predetermined positions of the conveyor belt 21 in the warm-up time of the apparatus, e.g., in the initializing operation carried out when the color copying machine 1 is turned on or in the reset operation after dealing with a jam. Alternatively, at least one pair of overlapping marks are formed at predetermined positions of the conveyor belt during an interval between timings at which paper sheets are supplied in an operation for forming an image on a plurality of recording paper sheets P. Otherwise, the overlapping marks Sf and Sr may be formed on the conveyor belt 21 at a timing of every task of continuous printing or every predetermined time.

When the overlapping marks Sf and Sr are to be formed on the conveyor belt 21, first, image data concerning the overlapping marks Sf and Sr is output from the mark generating circuit 104 and input to the image processing circuit 102. In the image processing circuit 102, the input image data concerning the overlapping marks Sf and Sr is processed as required, thereby suitably changing the positions of the overlapping marks along the main scanning direction, the pitches of the first line segments of the wedge marks of the four colors along the sub-scanning direction, the inclinations of the second line segments with respect to the first line segments of the wedge marks, when the overlapping marks are output to the conveyor belt 21. The image data concerning the overlapping marks Sf and Sr thus generated in the image processing circuit 102 is decomposed into image data concerning the wedge marks Yf (Yr), Mf (Mr), Cf (Cr) and Kf (Kr) corresponding to the respective color components, and input to the laser emission apparatuses 52 of the respective colors.

The laser emission apparatuses 52 of the respective colors emit laser beams based on the image data, input from the image processing circuit 102, concerning the wedge marks of the corresponding colors, and form electrostatic latent images concerning the wedge marks of the respective colors on the circumferential surfaces of the corresponding photosensitive drums 11Y, 11M, 11C and 11K. In this time, exposure timings of the laser emission apparatuses 52 of the respective colors, for forming electrostatic latent images on the circumferential surfaces of the corresponding photosensitive drums 11Y, 11M, 11C and 11K, are set such that the wedge marks of the respective colors overlap in close proximity in the sub-scanning direction on the conveyor belt 21, as shown in FIG. 3.

The electrostatic latent images formed on the circumferential surfaces of the photosensitive drums 11Y, 11M, 11C and 11K are passed through the corresponding developing apparatuses 13Y, 13M, 13C and 13K by the rotation of the photosensitive drums 11Y, 11M, 11C and 11K. Toners of the respective colors are supplied to the electrostatic latent images and developed. Thus, the visible toner images concerning the wedge marks of the respective colors on the photosensitive drums 11Y, 11M, 11C and 11K are passed through the transfer region opposing to the conveyor belt 21 by the rotation of the photosensitive drums, and transferred directly on the conveyor belt 21 by means of the transferring apparatuses 14Y, 14M, 14C and 14K. As a result, in an ideal case, the overlapping marks Sf and Sr formed by overlapping unfixed toners concerning the wedge marks of the respective colors, as shown in FIG. 3, are formed at the predetermined positions of the conveyor belt 21.

The overlapping marks Sf and Sr made of the wedge marks of the respective colors formed on the conveyor belt 21 are passed through the sensors 38f and 38r by the travel of the conveyor belt 21. They are detected by the mark detecting circuit 105 via the sensors 38f and 38r. In this time, the sensors 38f and 38r are positioned such that the optical axes thereof pass within detectable ranges (FIG. 3) of the overlapping marks Sf and Sr. Therefore, signals each having eight peaks are detected via the mark detecting circuit 105.

More specifically, the first line segment kf1 (kr1) of the wedge mark Kf (Kr) is detected as a first peak, the first line segment cf1 (cr1) of the wedge mark Cf (Cr) is detected as a second peak, the first line segment mf1 (mr1) of the wedge mark Mf (Mr) is detected as a third peak, the first line segment yf1 (yr1) of the wedge mark Yf (Yr) is detected as a fourth peak, the second line segment kf2 (kr2) of the wedge mark Kf (Kr) is detected as a fifth peak, the second line segment cf2 (cr2) of the wedge mark Cf (Cr) is detected as a sixth peak, the second line segment mf2 (mr2) of the wedge mark Mf (Mr) is detected as a seventh peak, and the second line segment yf2 (yr2) of the wedge mark Yf (Yr) is detected as an eighth peak. In other words, the detectable ranges W of the overlapping marks Sf and Sr are set such that the eight line segments can be independently detected by the corresponding sensors 38f and 38r in the above order. Thus, in an ideal case, the line segments in the detectable ranges W do not overlap.

The overlapping marks Sf and Sr formed on the conveyor belt 21 are passed through the respective sensors 38f and 38r and thereafter cleaned each time by the belt cleaner 40 arranged downstream of the sensors 38f and 38r.

The detection signals relating to the overlapping marks Sf and Sr detected by the mark detecting circuit 105 are input to the positional deviation amount calculating circuit 106. The positional deviation amount calculating circuit 106 calculates the amounts of positional deviation of the wedge marks of the respective colors based on the detection signals input from the mark detecting circuit 105. It outputs the calculated results as amounts of positional deviation of the output images formed by the image forming sections 10Y, 10M, 10C and 10K to the positional deviation correcting control circuit 107. Positional deviation of images may be positional deviation in the main scanning direction, positional deviation in the sub-scanning direction, tilt deviation, deviation of the magnification in the main scanning direction and deviation of the magnification in the sub-scanning direction.

The positional deviation correcting control circuit 107 compares the amount of positional deviation input from the positional deviation amount calculating circuit 106 with a preset threshold value. If the amount of positional deviation exceeds the threshold value, the amounts of correction for correcting the positional deviation are set. The threshold value, which serves as a criterion for judging whether or not to execute a correcting operation, is determined by the amount of correctable deviation and the required accuracy of correction of positional deviation, and can be changed to any value.

The amounts of correction set by the positional deviation correcting control circuit 107 include amounts of correction of the travel speed of the conveyor belt 21, the rotation speeds of the photo-sensitive drums 11Y, 11M, 11C and 11K, and laser emission timings by the laser emission apparatuses 52. In other words, the belt motor 22, the drum motors 9Y, 9M, 9C and 9K, the laser emission apparatuses 52, etc. are controlled on the basis of the amounts of correction set by the positional deviation correcting control circuit 107, thereby correcting the positional deviation of an image.

Thereafter, the positional deviation correcting operation using the overlapping marks Sf and Sr as described above is repeated until the amount of positional deviation calculated by the positional deviation amount calculating circuit 106 becomes smaller than the threshold value. When the amount of positional deviation becomes smaller than the threshold value, the amounts of correction are determined and stored in a memory (not shown).

In the case where the overlapping marks Sf and Sr are formed on the conveyor belt 21 during an interval between timings at which a plurality of recording paper sheets are supplied in an image forming operation, the mechanism sections of the color copying machine 1 are controlled based on the amounts of correction stored in the memory and the image forming operation is continued, until the image forming operation for all the recording paper sheets is completed.

On the other hand, in the case where the image forming operation is completed and then a next image forming operation is started after a while, the color drift correcting sequence is carried out based on the amounts of correction set and stored in the warm-up time in which the former image forming operation was started. In other words, in the case where a new image forming operation is started after a while, there is no change with time in the color copying apparatus 1. Therefore, color drift cannot be accurately corrected by correction based on the amounts of correction stored in the above-mentioned color drift correcting sequence during an interval between timings at which recording paper sheets are supplied.

If the color drift of the image is corrected with the overlapping marks Sf and Sr of the present invention formed on the conveyor belt 21 in the warm-up time, e.g., when the color copying machine 1 is turned on or in the reset operation after dealing with a jam, the process time required for correcting the color drift in the warm-up time can be considerably reduced. More specifically, since the overlapping marks Sf and Sr of the present invention is formed by overlapping the wedge marks of the respective colors in close proximity along the sub-scanning direction, a sufficient number of marks can be formed in a very narrow range along the sub-scanning direction. Accordingly, the times for forming, detecting and processing the marks can be reduced.

For this reason, if the overlapping marks Sf and Sr of the present invention are used for correcting color drift in the warm-up time, the time required before first copy can be reduced and the productivity of the color copying machine 1 can be improved.

Further, if the overlapping marks Sf and Sr of the present invention are used for correcting color drift in the warm-up time, a greater number of marks can be formed within a unit length on the conveyor belt 21. Therefore, the amount of sampling signals per unit time for correcting color drift can be considerably increased, resulting in improvement of the accuracy in correction of color drift. As a result, the reliability of the color drift correcting process can be improved and color drift can be corrected more accurately.

If color drift is corrected by the overlapping marks Sf and Sr of the present invention formed on the conveyor belt 21 during an interval between timings at which a plurality of recording paper sheets are supplied, a sufficient number of marks can be formed in a very narrow range along the sub-scanning direction. Therefore, the distance between the supplied recording paper sheets can be reduced. Accordingly, the number of paper sheets passed in a unit time can be increased and the productivity of the color copying machine 1 can be improved. When the overlapping marks Sf and Sr of the present invention is used, the positional deviation of an image along both the main scanning direction and sub-scanning direction can be corrected simultaneously. Therefore, color drift can be corrected by the overlapping marks formed only in an interval between timings at which a plurality of recording paper sheets are supplied. Thus, the color drift correcting operation in the warm-up time can be omitted. As a result, waiting time required for color drift correction until first copy can be eliminated. Accordingly, the productivity can be further improved.

Figure 4:
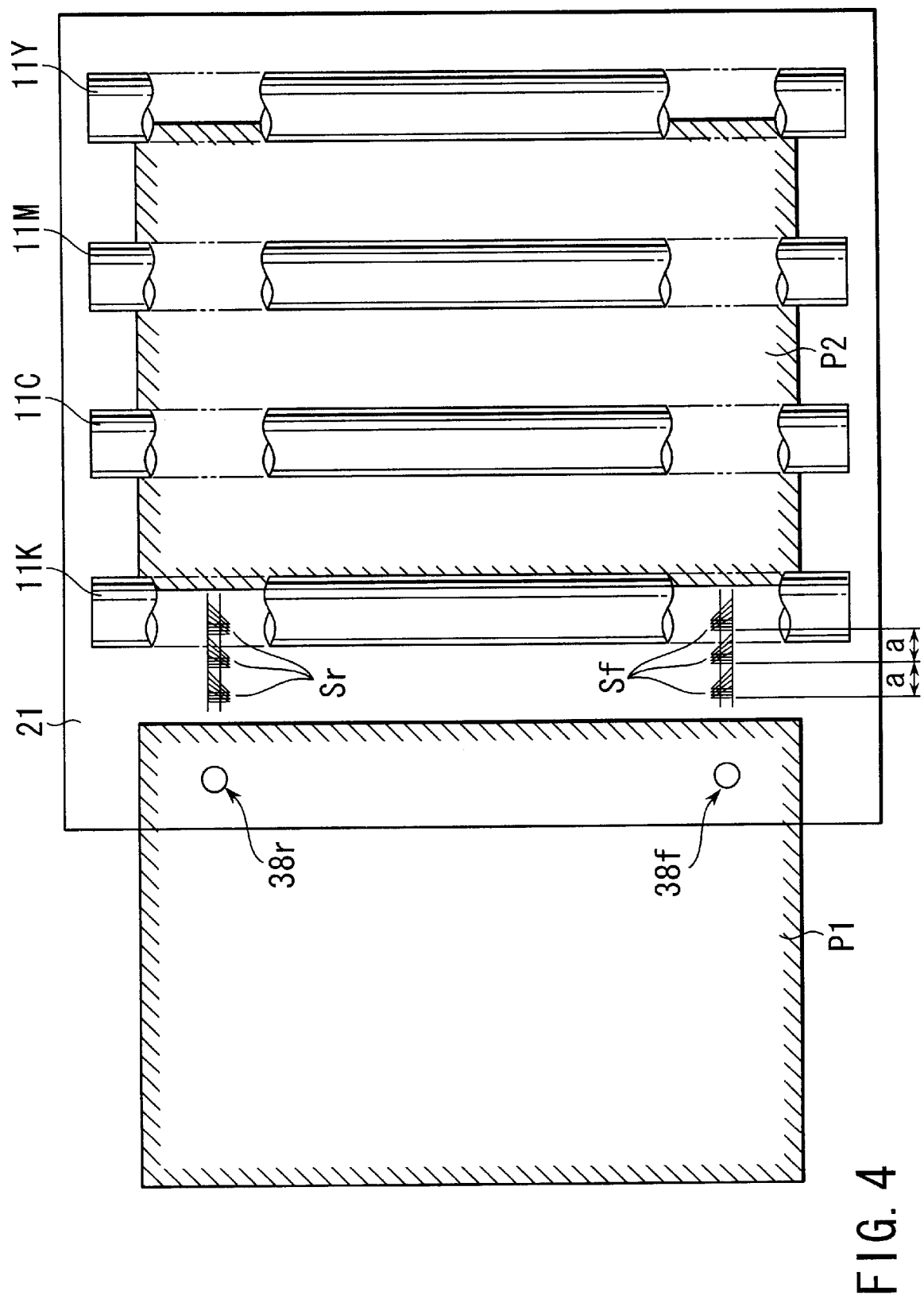
FIG. 4 is a diagram showing a state in which three pairs of overlapping marks shown in FIG. 3 are formed in a region between supplied paper sheets.
Figure 5:
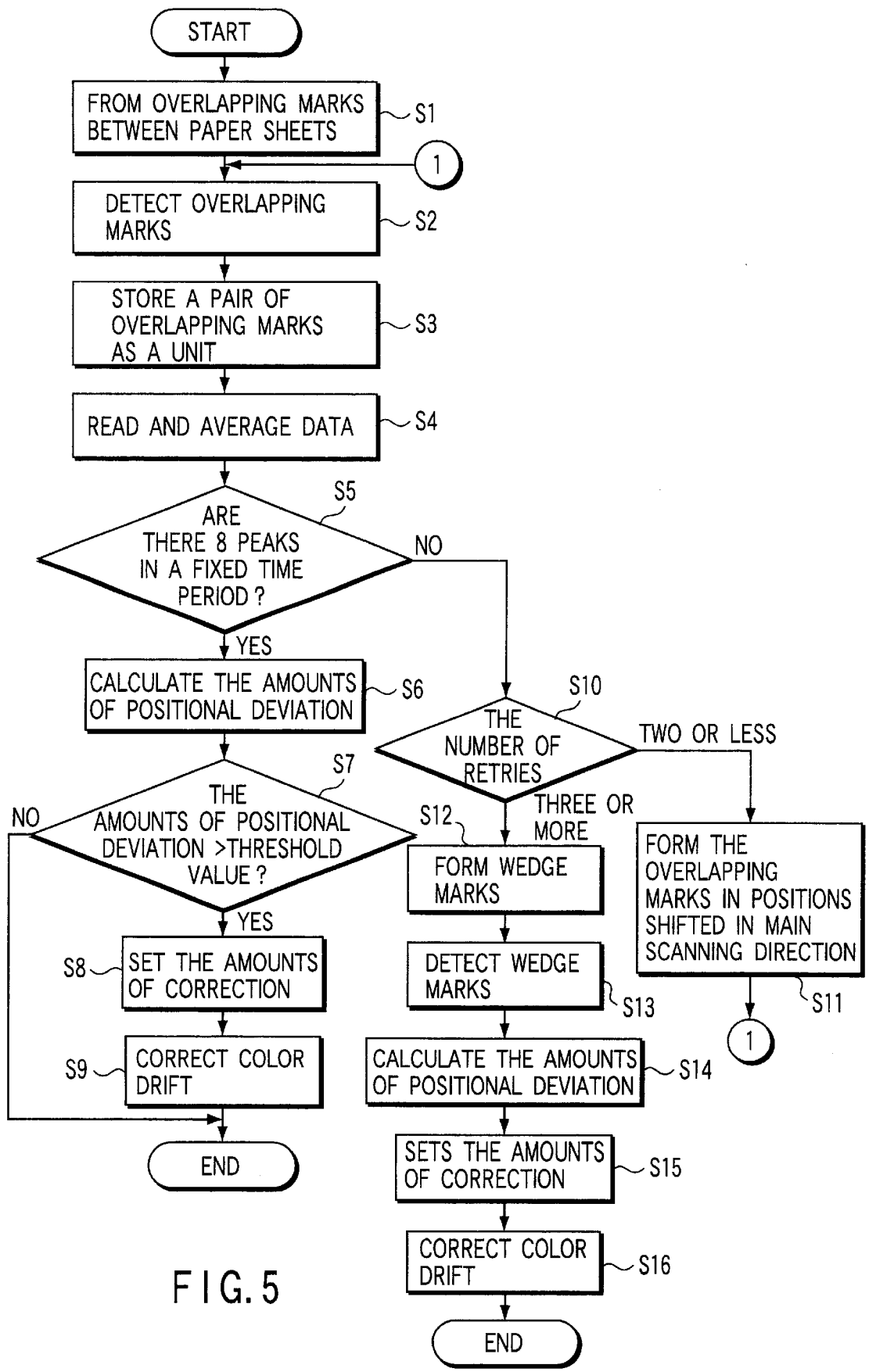
FIG. 5 is a flowchart for explaining a color drift correcting sequence of the present invention.

An embodiment of the color drift correcting sequence, using the overlapping marks Sf and Sr of the present invention, will be described with reference to FIGS. 4 and 5. FIG. 4 shows a state in which three pairs of overlapping marks Sf and Sr are formed on the conveyor belt 21 in an interval between timings at which a plurality of recording paper sheets P are supplied. FIG. 5 is a flowchart for explaining a color drift correcting sequence of this embodiment.

When the color drift correcting sequence of this embodiment is started, the aforementioned overlapping marks Sf and Sr are formed on the conveyor belt 21 in an interval between timings at which a plurality of recording paper sheets P are supplied, for example, between a recording paper sheet P1 and a next recording paper sheet P2 shown in FIG. 4 (step 1). In this embodiment, three pairs of overlapping marks Sf and Sr are formed at regular intervals along the sub-scanning direction between the supplied paper sheets.

The three pairs of overlapping marks Sf and Sr formed on the conveyor belt in the step 1 are moved by the travel of the conveyor belt 21, and successively passed through the optimal axes of the sensors 38f and 38r. As a result, the three pairs of overlapping marks Sf and Sr are successively detected by the mark detecting circuit 105 via the pair of sensors 38f and 38r (step 2). In this time, assuming that there is no substantial deviation in each of the overlapping marks Sf and Sr, a signal having eight peaks with respect to one overlapping mark Sf (Sr), as described above, is detected in a fixed period of time determined on the basis of pitches of the wedge marks along the sub-scanning direction, inclinations of the wedge marks and the travel speed of the conveyor belt 21.

Signals detected by the mark detecting circuit 105 are provisionally stored in a memory (not shown) in the positional deviation calculating circuit 106 in units of data corresponding to one pair of overlapping marks Sf and Sr (ideally, having 16 peaks) (step 3). In this embodiment, since three pairs of overlapping marks Sf and Sr are formed in every interval between paper sheets, data for three units are temporarily stored in the memory in every interval.

The data concerning the overlapping marks Sf and Sr provisionally stored in the memory are successively read by the positional deviation amount calculating circuit 106, and the data concerning the overlapping marks for three units are averaged (step 4). The positional deviation amount calculating circuit 106 determines whether averaged data, i.e., average data concerning the overlapping mark Sf on the front side and average data concerning the overlapping mark Sr on the rear side, respectively have eight peaks in a fixed time period (step 5).

As a result of the determination of the step 5, if it is confirmed that the average data concerning the overlapping marks Sf and Sr respectively have eight peaks in a fixed time period (step 5: YES), the amounts of positional deviation of the respective overlapping marks Sf and Sr are calculated by the positional deviation calculating circuit 106 on the basis of data concerning the pair of overlapping marks each having eight peaks (step 6). Positional deviation of the overlapping marks Sf and Sr may be positional deviation in the main scanning direction, positional deviation in the sub-scanning direction, tilt deviation, deviation of the magnification in the main scanning direction and deviation of the magnification in the sub-scanning direction.

The amounts of positional deviation calculated by the positional deviation amount calculating circuit 106 are output to the positional deviation correcting control circuit 107 as the amounts of color drift of images in the image forming sections 10Y, 10M, 10C and 10K.

The positional deviation correcting control circuit 107 compares the respective amounts of positional deviation input from the positional deviation amount calculating circuit 106 with the respective threshold values prepared in advance (step 7). If the amount of positional deviation exceeds the threshold value (step 7: YES), the amount of correction for correcting the positional deviation is set (step 8). As a result of the determination in the step 7, if the amounts of positional deviation are determined to be smaller than the threshold values (step 7: NO), it is determined that each amount of positional deviation falls under a permissible range which does not require correction. Therefore, a positional deviation correcting operation is not performed.

Then, the laser emission timings in the laser emission apparatuses 52, the travel speed of the conveyor belt 21 and the rotation speed of the photosensitive drums 11Y, 11M, 11C and 11K are corrected on the basis of the amounts of correction set in the step 8. As a result, the color drift of the respective colors formed in the image forming sections 10Y, 10M, 10C and 10K (step 9). The amounts of correction which are set in the step 8 may be about ½ or ⅓ weighted if necessary, before used for correction control. In other words, according to the color drift correction using the overlapping marks Sf and Sr of the present invention, a control for gradually reducing the positional deviation to zero can be selected, instead of correcting the detected positional deviation by one correcting operation.

If it is determined that the average data concerning the overlapping marks Sf and Sr respectively have eight peaks in a fixed time period (step 5: NO), it is determined that the amounts of positional deviation of the respective overlapping marks Sf and Sr exceed limits, and the number of retries of process operations in the steps 1 to 5 is confirmed (step 10).

In the step 10, if it is determined that the number of retries is two or less, the image data relating to the overlapping marks Sf and Sr is processed by the image processing circuit 102, and the output positions of the overlapping marks on the conveyor belt 21 are slightly moved along the main scanning direction (step 11). More specifically, the output positions of the overlapping marks on the conveyor belt 21 are moved along the main scanning direction, such that the optical axes of the sensors 38f and 38r are passed through the detectable ranges W of the respective overlapping marks Sf and Sr without failure to correctly detect the line segments of the overlapping marks Sf and Sr. In this case, the difference in detection time between the fourth peak (yf1, yr1) and the fifth peak (kf2, kr2) of the data concerning the overlapping marks Sf and Sr averaged in the step 4 is compared with a predetermined reference time. If the difference in time between the peaks is considerably smaller than the reference time, it is determined that the overlapping marks Sf and Sr are formed in positions shifted nearer to the edges of the conveyor belt 21, and the overlapping marks are moved toward the center of the conveyor belt 21 along the main scanning direction. If the difference in time between the peaks is considerably greater than the reference time, it is determined that the overlapping marks Sf and Sr are formed in positions shifted nearer to the center of the conveyor belt 21, and the overlapping marks are moved toward the edges of the conveyor belt 21 along the main scanning direction. The overlapping marks Sf and Sr moved along the main scanning direction are detected via the sensors 38f and 38r and the processes in and after the step 2 are repeated.

If the overlapping marks Sf and Sr are moved along the main scanning direction as in the step 11, the detection positions of the overlapping marks detected by the sensors 38f and 38r can be changed along the main scanning direction. As a result, the eight peaks can be respectively moved to detectable positions. The detectable ranges W of the overlapping marks Sf and Sr of the present invention as described above are narrower than those of the conventional continuous wedge marks which do not overlap. Therefore, the possibility of the marks being undetected is reduced by adding the process of the step 11.

In stead of moving the overlapping marks Sf and Sr in the main scanning direction in the step 11, the image data relating to the overlapping marks Sf and Sr may be processed so as to change the pitches of the wedge marks along the sub-scanning direction or the inclinations between the line segments of the respective wedge marks. More specifically, the pitches of the wedge marks along the sub-scanning direction may be increased, or the inclinations of the respective wedge marks may be increased, so that the possibility of data being detected can be higher. The inclination or the pitch may be changed, after the overlapping marks Sf and Sr are moved in the main scanning direction.

If the number of retries confirmed in the step 10 is three or more, it is determined that the eight peaks cannot be detected only by moving the overlapping marks Sf and Sr in the main scanning direction (or changing the pitches in the sub-scanning directions or the inclinations). In this case, the operation is switched to a positional deviation correcting operation using a plurality of wedge marks arranged along the sub-scanning direction separately so as not to overlap one another (see FIG. 6).

In this positional deviation correcting operation, the image forming operation, i.e., the supply of the recording paper sheets P is interrupted, and the wedge marks 39f and 39r of the respective colors are continuously formed via the image forming sections 10Y, 10M, 10C and 10K on predetermined positions on the conveyor belt 21 at predetermined intervals (step 12). The wedge marks 39f and 39r of the respective colors formed on the conveyor belt 21 are passed through the sensors 38f and 38r by the travel of the conveyor belt 21, and detected via the mark detecting circuit 105 (step 13).

The amounts of positional deviation of the wedge marks of the respective colors are calculated by the positional deviation calculating circuit 106 on the basis of data concerning the wedge marks 39f and 39r detected in the step 13 (step 14). The amounts of positional deviation are output to the positional deviation correcting control circuit 107 as the amounts of positional deviation in the image forming sections 10Y, 10M, 10C and 10K.

The positional deviation correcting control circuit 107 sets amounts of correction for correcting the positional deviations based on the amounts of positional deviation input from the positional deviation amount calculating circuit 106 (step 15). Based on the amounts of correction set by the positional deviation correcting control circuit 107, the mechanism sections of the color copying machine 1 are regulated to correct the color drift of the image (step 16). In this case, the amounts of correction set by the positional deviation correcting control circuit 107 are not weighted, and used for color drift correction as they are.

After the process of the step 16, the process may be returned to the color drift correcting operation using the overlapping marks Sf and Sr starting with the step 1. In this case, the image data, the positions of which have been changed along the main scanning direction in the step 11, are returned to the original state. If the pitches along the sub-scanning direction or the inclinations of the respective wedge marks are changed, the image data which have been changed are returned to the original state.

Figure 6:
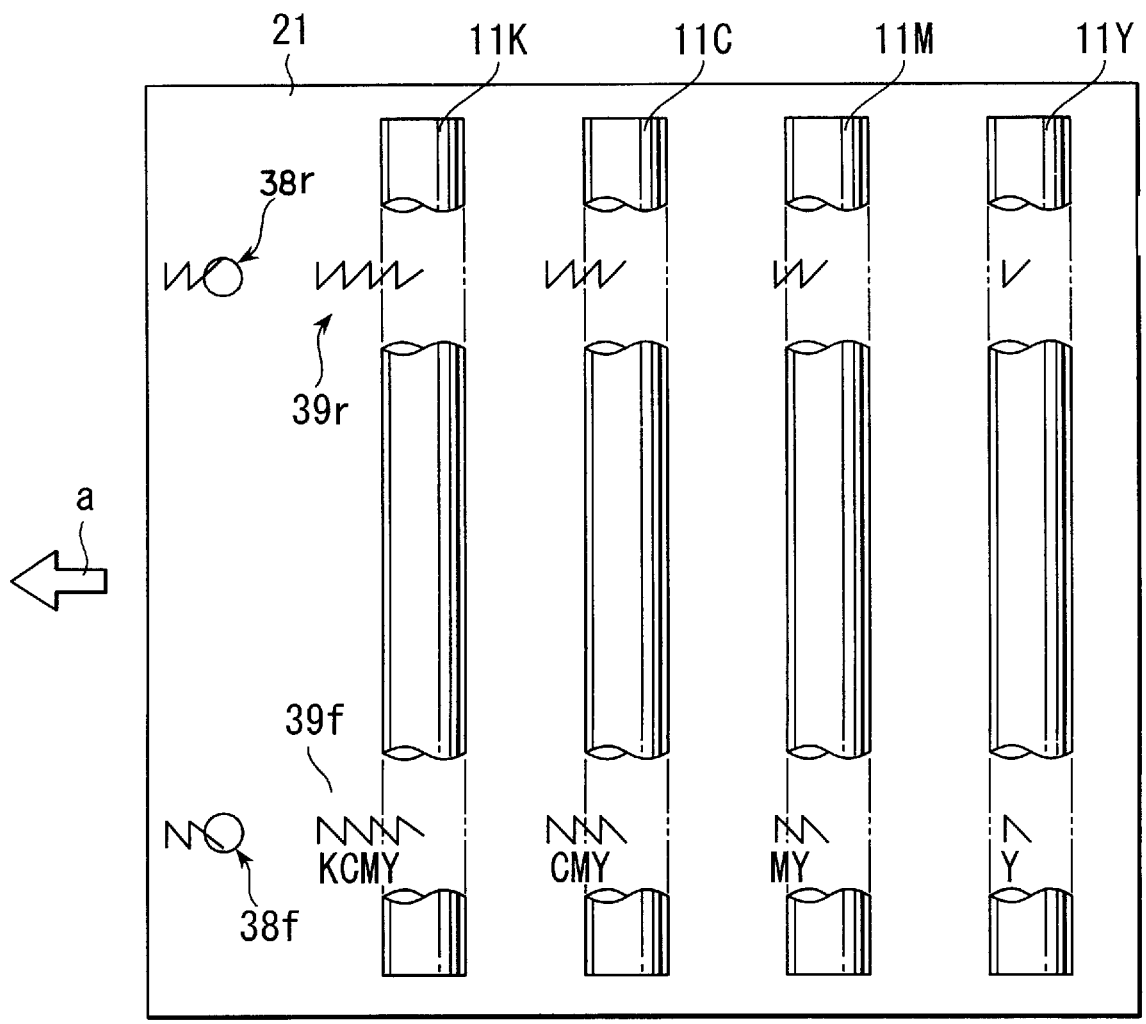
FIG. 6 is a diagram showing a state in which the conventional wedge-shaped marks are formed on a conveyor belt.

As described above, according to the color drift correcting sequence of this embodiment, first, the overlapping masks Sf and Sr are formed between paper sheets and the color drift of the image is reduced to a predetermined level. Only when the color drift is not corrected by the color drift correcting operation between paper sheets, the image forming operation is stopped and the color drift correcting operation using the wedge marks shown in FIG. 6 is executed. Therefore, the color drift correcting operation in the warm-up time, e.g., at the power-on time of the color copying machine 1 or the reset time after dealing with a jam, can be omitted. Accordingly, the time required before first copy can be reduced and the productivity can be improved.

Figure 7:
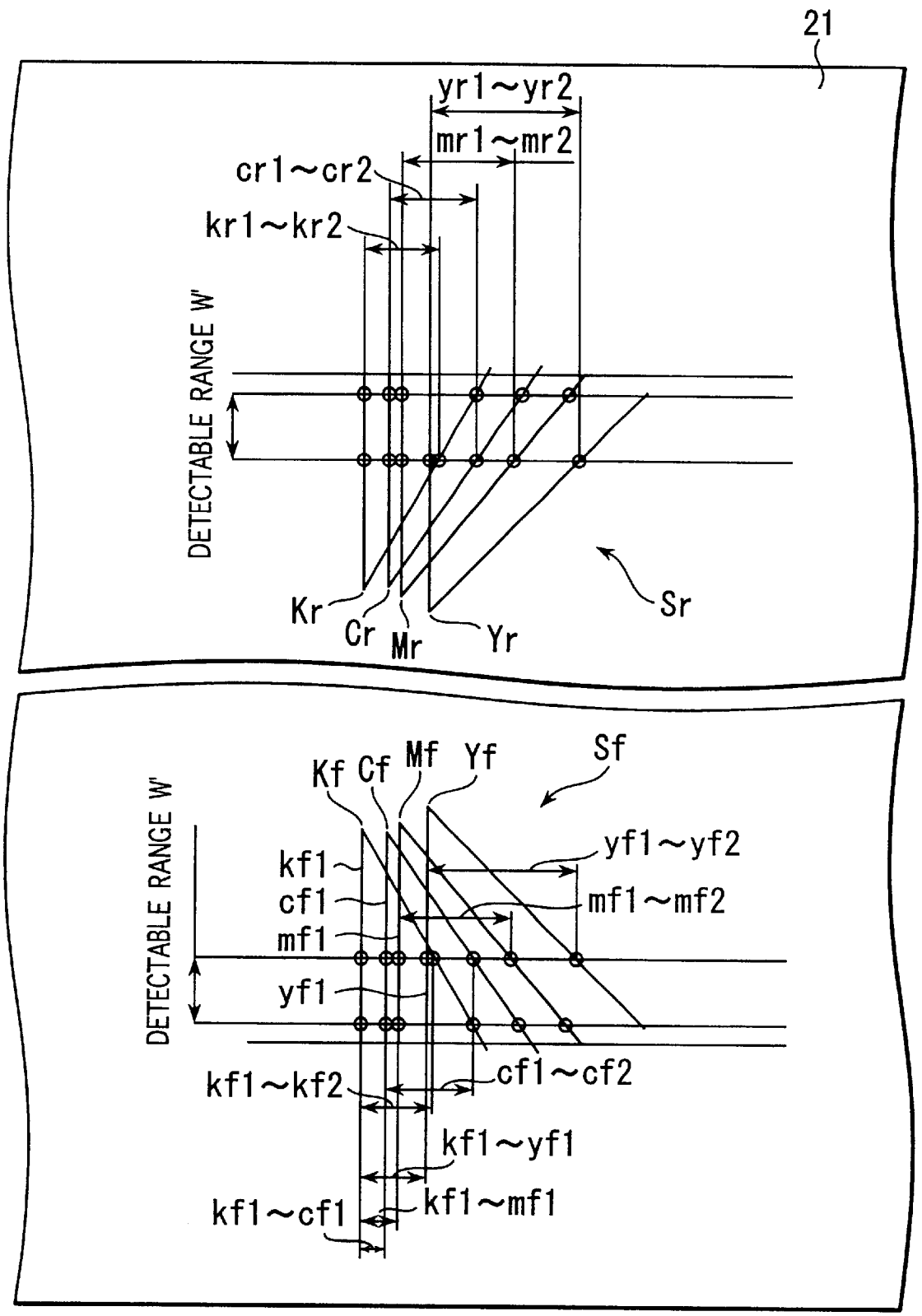
FIG. 7 is a diagram showing a pair of overlapping marks including positional deviation.

Next, a method will now be described with reference to FIG. 7, in which method the overlapping marks Sf and Sr are detected, the amounts of deviation of the overlapping marks are calculated, and the color drift of the image is corrected based on the calculation result. FIG. 7 shows an example of a pair of overlapping marks Sf and Sr including deviations formed on the conveyor belt 21. It is assumed that the overlapping marks are based on the data averaged in the above step 4.

First, to correct color drift of the image along the sub-scanning direction, of the data obtained by detecting the overlapping mark Sf, for example, on the front side, the time interval (kf1–cf1) between detection of the first peak (kf1) and detection of the second peak (cf1), the time interval (kf1–mf1) between detection of the first peak and detection of the third peak (mf1), and the time interval (kf1–yf1) between detection of the first peak and detection of the fourth peak (yf1) are calculated. The calculated time intervals are respectively compared with reference time intervals prepared in advance, i.e., the time intervals between the first peak and the second to fourth peaks obtained when the overlapping marks Sf and Sr free from deviation are formed as shown in FIG. 3. Then, the respective time differences are calculated. The calculated time differences are amplified with a suitable gain, and the image forming sections 10Y, 10M, 10C and 10K are feedback-controlled, thereby correcting the color drift of the image along the sub-scanning direction. Although in this embodiment the overlapping mark Sf on the front side is used, the overlapping mark Sr on the rear side may be used.

Secondly, to correct color drift of the image along the main scanning direction, concerning the overlapping mark Sf, for example, on the front side, the time intervals between detection of the first line segments yf1, mf1, cf1 and kf1 of the wedge marks Yf, Mf, Cf and Kf on one hand and detection of the second line segments yf2, mf2, cf2 and kf2 on the other are calculated. In other words, the time interval (kf1–kf2) between the first peak and the fifth peak, the time interval (cf1–cf2) between the second peak and the sixth peak, the time interval (mf1–mf2) between the third peak and the seventh peak and the time interval (yf1–yf2) between the fourth peak and the eighth peak are calculated.

In the overlapping mark Sf of the present invention, since the inclinations of the wedge marks Yf, Mf, Cf and Kf of the respective color are different from one another, it is meaningless to simply compare the time intervals between the first line segments and the second line segments of the respective wedge marks. To compare the positions of the wedge marks Yf, Mf, Cf and Kf along the main scanning direction, (Time Interval between First and Second Line Segments/tan θ) of each wedge mark is calculated, where θ denotes the inclination of each wedge mark. More specifically, (kf1–kf2)/tan 30°, (cf1–cf2)/tan 35°, (mf1–mf2)/tan 40° and (yf1–yf2)/tan 45° are calculated.

Then, the amounts of relative deviation of (cf1–cf2)/tan 35°, (mf1–mf2)/tan 40° and (yf1–yf2)/tan 45° are respectively calculated with reference to the calculation result of (kf1–kf2)/tan 30° concerning the wedge mark Kf on the most downstream side. Further, the calculated amounts of deviation are amplified with a suitable gain, and the exposure timings in the respective image forming sections 10Y, 10M and 10C are feedback-controlled to coincide with the image forming timing in the image forming section 10K. As a result, the color drift along the main scanning direction of the image is corrected.

Thirdly, to correct tilt deviation, a time difference (kf1–kr1) between the first peak (kf1) of the overlapping mark Sf on the front side and the first peak (kr1) of the overlapping mark Sr on the rear side, a time difference (cf1–cr1) of the second peaks on the front and rear sides, a time difference (mf1–mr1) of the third peaks on the front and rear sides and a time difference (yf1–yr1) of the fourth peaks on the front and rear sides are respectively calculated. The amount of deviation along the sub-scanning direction corresponding to the calculated time difference (Time Difference×Travel Speed of Conveyor Belt) is calculated. Further, a tilt is calculated by dividing each of the calculated amounts of deviation by the distance between the sensors 38f and 38r.

Tilt deviation may occur in an image for the reason that electrostatic latent images formed on the circumferential surfaces of the photosensitive drums 11Y, 11M, 11C and 11K are inclined due to an error of the lens shape or positional deviation of optical members. Therefore, to correct the tilt deviation of the image, the mounting angles and the mounting positions of the optical members, such as lenses and mirrors, are adjusted.

Fourthly, to correct deviation of the magnification in the main scanning direction of an image, first the positional deviation along the main scanning direction is corrected as described above, using the overlapping mark Sf on the front side. Then, the time intervals from detection of the first line segments kr1, cr1, mr1 and yr1 of the wedge marks Kr, Cr, Mr and Yr of the overlapping mark Sr on the rear side to detection of the second line segments kr2, cr2, mr2 and yr2 are respectively calculated. In other words, the time interval (kr1–kr2) between the first peak and the fifth peak, the time interval (cr1–cr2) between the second peak and the sixth peak, the time interval (mr1–mf2) between the third peak and the seventh peak and the time interval (yr1–yr2) between the fourth peak and the eighth peak are calculated.

Thereafter, in order to compensate for the differences in inclination of the respective wedge marks, (Time Interval between First and Second Line Segments/tan θ) of each wedge mark is calculated. More specifically, (kr1–kr2)/tan 30°, (cr1–cr2)/tan 35°, (mr1–mr2)/tan 40° and (yr1–yr2)/tan 45° are calculated. Then, the amounts of relative deviation of (cr1–cr2)/tan 35°, (mr1–mr2)/tan 40° and (yr1–yr2)/tan 45° are respectively calculated with reference to the calculation result of (kr1–kr2)/tan 30° concerning the wedge mark Kr on the most downstream side.

Alternatively, the amounts of relative deviation may be calculated by calculating {(kf1–kf2)–(kr1–kr2)}/tan 30°, {(cf1–cf2)–(cr1–cr2)}/tan 35°, {(mf1–mf2)–(mr1–mr2)}/tan 40° and {(yf1–yf2)–(yr1–yr2)}/tan 45°.

Deviation of the magnification in the main scanning direction occurs because the length of one scan with respect to the circumferential surface of each of the photosensitive drums 11Y, 11M, 11C and 11K is changed due to an error of the lens shape or positional deviation of optical members. Therefore, the scan lengths in the respective photosensitive drums 11Y, 11M, 11C and 11K are corrected by shifting the laser emission clocks by the laser emission apparatuses 52 of the respective colors based on the amounts of relative deviation calculated as described above.

The present invention is not limited to the above embodiment, but can be modified variously within the scope of this invention. For example, in the above embodiment, after the overlapping marks Sf and Sr are formed between paper sheets, if the color drift is not fully corrected, the operation is switched to the color drift correcting operation using the conventional wedge marks. However, the overlapping marks Sf and Sr may be used instead of the conventional wedge marks. In this case, the time required for processes in the step 12 and the subsequent steps shown in FIG. 5 is considerably reduced. In other words, since the overlapping marks Sf and Sr of the present invention can be formed at a higher density along the sub-scanning direction as compared to the conventional wedge marks 39f and 39r, a sufficient number of marks can be formed within a unit length on the conveyor belt 21. Therefore, a shorter period of time is required to obtain sampling data to substantially the same extent as those obtained by the conventional wedge marks.

The overlapping marks Sf and Sr of the present invention may be used for the purpose of monitoring whether color drift is present, whereas the conventional wedge marks may be used for the actual correcting operation. For example, the overlapping marks Sf and Sr of the present invention may be formed on the conveyor belt 21 during an interval between timings at which the paper sheets are supplied, and the operation may be switched to the color drift correcting operation using the conventional wedge marks, when color drift exceeding a predetermined level is detected.

What is claimed is:

1. An image forming method for forming a predetermined image by conveying media, on which an image is to be formed, to a plurality of image forming sections by conveying means, and superposing images formed by said plurality of image forming sections on the conveyed media, said method comprising:

a mark forming step for forming a plurality of marks on the conveying means by said image forming sections;

a detecting step for detecting said plurality of marks; and a correcting step for correcting overlap of images formed by said plurality of image forming sections based on a result of detection obtained by the detecting step, said plurality of marks having first line segments extending in a first direction and second line segments extending from first ends of the first line segments at predetermined angles with the first direction, said predetermined angles varying among said plurality of marks.

2. An image forming method according to claim 1, wherein said plurality of image forming sections are arranged side by side and separated from one another along a second direction perpendicular to the first direction, and the conveying means conveys the media along the second direction.

3. An image forming method according to claim 2, wherein said plurality of marks are formed symmetrical with respect to a center line of the conveying means extending in the second direction.

4. An image forming method according to claim 3, wherein said plurality of marks are formed on the conveying means, such that the first line segments of said plurality of marks are arranged in proximity at regular intervals along the second direction and that said plurality of marks overlap one another along the second direction.

5. An image forming method according to claim 4, wherein said plurality of marks have inclinations which are set to gradually increase in an order of arrangement along the second direction, such that the second line segments of the plurality of marks overlapping one another do not cross.

6. An image forming method according to claim 1, further comprising an erasing step for erasing said plurality of marks formed on the conveying means by said plurality of image forming sections in the mark forming step, each time they are detected in the detecting step.

7. An image forming method according to claim 1, wherein said plurality of marks are formed continuously on the conveying means in a warm-up time in which the media is not conveyed.

8. An image forming method according to claim 1, wherein said plurality of marks are formed on the conveying means during an interval between timings at which the media are continuously conveyed by the conveying means.

9. An image forming method for forming a predetermined image by conveying media, on which an image is to be formed, to a plurality of image forming sections by conveying means, and superposing images formed by said plurality of image forming sections on the conveyed media, said method comprising:

a mark forming step for forming a plurality of marks on the conveying means by said image forming sections;

a detecting step for detecting said plurality of marks;

a correcting step for correcting overlap of images formed by said plurality of image forming sections based on a result of detection obtained by the detecting step, and a modifying step for modifying said plurality of marks formed in the mark forming step, on condition that all marks are not detected in the detecting step, said plurality of marks having first line segments extending in a first direction and second line segments extending from first ends of the first line segments at predetermined angles with respect to the first direction, said predetermined angles varying among said plurality of marks.

10. An image forming method according to claim 9, wherein said plurality of image forming sections are arranged side by side and separated from one another along a second direction perpendicular to the first direction, and the conveying means conveys the media along the second direction.

11. An image forming method according to claim 10, wherein said plurality of marks are formed symmetrical with respect to a center line of the conveying means extending in the second direction.

12. An image forming method according to claim 11, wherein said plurality of marks are formed on the conveying means, such that the first line segments of said plurality of marks are arranged in proximity at regular intervals along the second direction and that said plurality of marks overlap one another along the second direction.

13. An image forming method according to claim 9, wherein said plurality of marks are moved along the first direction in the modifying step.

14. An image forming method according to claim 9, wherein inclinations of the second line segments with respect to the first line segments of said plurality of marks are changed in the modifying step.

15. An image forming method according to claim 12, wherein pitches along the second direction of the first line segments of said plurality of marks is changed in the modifying step.

16. An image forming method for forming a predetermined image by conveying media, on which an image is to be formed, to a plurality of image forming sections by conveying means, and superposing images formed by said plurality of image forming sections on the conveyed media, said method comprising:

a mark forming step for forming a plurality of marks on the conveying means by said image forming sections;

a detecting step for detecting said plurality of marks;

a deviation amount calculating step for calculating amounts of deviation of said plurality of marks based on a result of detection obtained by the detecting step;

a comparing step for comparing the amounts of deviation calculated in the deviation amount calculating step with a threshold value prepared in advance; and a correcting step for correcting overlap of images formed by said plurality of image forming sections based on the amounts of deviation calculated in the deviation amount calculating step, on condition that the amounts of deviation exceed the threshold value as a result of the comparing step, said plurality of marks having first line segments extending in a first direction and second line segments extending from first ends of the first line segments at predetermined angles with respect to the first direction, said predetermined angles varying among said plurality of marks.

17. An image forming method according to claim 16, wherein the threshold value is arbitrarily changeable.

18. An image forming method according to claim 16, wherein amounts of correction are set based on the amounts of deviation calculated in the deviation amount calculating step, and the amounts of correction are weighted to correct superposition of the images.

* * * * *